United States Patent
Kra (10) Patent No.: US 7,353,398 B2
(45) Date of Patent: Apr. 1, 2008

(54) ARTICLE, METHOD, SYSTEM AND APPARATUS FOR DECENTRALIZED CREATION, DISTRIBUTION, VERIFICATION AND TRANSFER OF VALUABLE DOCUMENTS

(75) Inventor: David Alan Kra, West Orange, NJ (US)

(73) Assignee: International Business Machines Corporation, Armonk, NY (US)

( * ) Notice: Subject to any disclaimer, the term of this patent is extended or adjusted under 35 U.S.C. 154(b) by 775 days.

(21) Appl. No.: 10/156,929

(22) Filed: May 29, 2002

(65) Prior Publication Data

US 2003/0226028 A1 Dec. 4, 2003

(51) Int. Cl.
*H04L 9/00* (2006.01)
*G09C 3/00* (2006.01)
*G09C 3/08* (2006.01)
*B42D 15/10* (2006.01)

(52) U.S. Cl. .......................... 713/181; 380/55; 380/51; 283/72

(58) Field of Classification Search .............. 380/51, 380/55; 713/176, 181; 283/72
See application file for complete search history.

(56) References Cited

U.S. PATENT DOCUMENTS

| | | | | |
|---|---|---|---|---|
| 5,161,829 | A * | 11/1992 | Detrick et al. ................. | 283/91 |
| 5,497,990 | A | 3/1996 | Nanni ..................... | 273/138 A |
| 5,570,465 | A * | 10/1996 | Tsakanikas ................. | 358/1.15 |
| 5,750,972 | A | 5/1998 | Botvin ........................ | 235/379 |
| 5,790,677 | A | 8/1998 | Fox et al. ..................... | 380/24 |
| 5,816,619 | A | 10/1998 | Schaede ...................... | 283/67 |
| 6,032,150 | A | 2/2000 | Nguyen ...................... | 707/102 |
| 6,085,322 | A * | 7/2000 | Romney et al. ............ | 713/176 |
| 6,111,953 | A * | 8/2000 | Walker et al. ................ | 380/51 |
| 6,170,744 | B1 * | 1/2001 | Lee et al. .................... | 235/380 |
| 6,195,452 | B1 * | 2/2001 | Royer ......................... | 382/135 |
| 6,233,340 | B1 * | 5/2001 | Sandru ........................ | 380/51 |
| 6,363,483 | B1 * | 3/2002 | Keshav ....................... | 713/176 |
| 6,553,494 | B1 * | 4/2003 | Glass .......................... | 713/186 |
| 6,611,598 | B1 * | 8/2003 | Hayosh ....................... | 380/54 |
| 6,862,583 | B1 * | 3/2005 | Mazzagatte et al. .......... | 705/64 |
| 7,191,149 | B1 * | 3/2007 | Lanham et al. ............... | 705/38 |
| 2001/0002485 | A1 * | 5/2001 | Bisbee et al. ............... | 713/167 |
| 2001/0011255 | A1 * | 8/2001 | Asay et al. .................. | 705/76 |

(Continued)

*Primary Examiner*—Emmanuel L. Moise
*Assistant Examiner*—Techane J. Gergiso
(74) *Attorney, Agent, or Firm*—Karl O. Hesse (57) ABSTRACT

The invention described herein utilizes a universally known and accepted unique item that is independently identifiable and valuable so as to be constituted for difficulty of counterfeiting as an authenticator item. The identity of this item is included in an authorization calculation which can only be accomplished by an authorizing issuing authority. In a preferred embodiment of the invention, the authenticator is a serial numbered item such as a currency bill or note. The document may be created in a decentralized fashion using ordinary plain paper and the document may even take electronic or other forms. The issuing authority must have the critical or important details of the document and must authorize the creation of the document before it can be created. Further the document's authenticity may be verified without communication back to the issuing authority.

The invention allows the creation of valuable negotiable business documents at locations throughout the world and the creation may be done by any of an issuing authority, an agent of the issuing authority, a bearer and even the buyer. The invention described allows cancellation to prevent negotiation of an electronic document regardless of how many copies are extant in computers or other form merely by defacing or destroying the associated authenticator.

3 Claims, 5 Drawing Sheets

U.S. PATENT DOCUMENTS

2002/0042884 A1* 4/2002 Wu et al. .................. 713/201
2002/0080959 A1* 6/2002 Weller ........................ 380/55
2003/0005303 A1* 1/2003 Auslander et al. .......... 713/176
2003/0089764 A1* 5/2003 Meadow et al. ............ 235/375
2003/0120936 A1* 6/2003 Farris et al. ................ 713/189

* cited by examiner

ARTICLE, METHOD, SYSTEM AND APPARATUS FOR DECENTRALIZED CREATION, DISTRIBUTION, VERIFICATION AND TRANSFER OF VALUABLE DOCUMENTS

BACKGROUND OF THE INVENTION

1. Field of the Invention

The present invention relates to valuable documents such as order bills of lading, negotiable certificates of cargo insurance, lottery or other valuable tickets, and other such documents that may be bought and sold or otherwise may be subject to transactions that require verification of authenticity.

2. Description of Related Art

Currently, negotiable documents are subject to copying, alteration and unauthorized creation. Unauthorized creation is possible even when the document is printed on serial numbered security paper since the paper stock itself could have been counterfeit or stolen. For these reasons, it is usually not possible to verify the authenticity of such a document without communication back to an issuing authority. One example of this nature is U.S. Pat. No. 5,816,619 issued to Schaede. The document of Schaede uses a foil hologram.

Current practice is in some cases even less secure because documents are not printed on serial numbered security paper due to the costs of creating, distributing, securing, and tracking the paper and its usage. U.S. Pat. No. 5,497,990 uses a serial numbered currency note or bill as a lottery input mechanism and prints a receipt which is the evidence that is used to claim a prize. If the same note is played three times, and the number derived from the note happens to be selected by the lottery computer as the winning number, the prize will be divided three ways. Thus in this teaching, the note is used only as input to avoid printing tickets, game cards or betting slips and not to verify authenticity. To prevent fraud, the receipt must still be printed on special paper.

When an issuing agency issues documents on behalf of multiple issuing authorities, the issuing agent must acquire, securely store, and track the paper stock of each issuing authority. This is mitigated only somewhat when there is an industry wide common paper stock such as is used for airline tickets.

The use of serial numbered security paper stock limits the ability of legitimate but geographically dispersed participants in a transaction from issuing a document due to the limited distribution of the security paper stock. Also in those instances where a document is time limited, the special paper can not be reused and therefore the cost of the paper becomes significant.

An example of the current art in electronic commerce is U.S. Pat. No. 6,032,150 issued to Nguyen. This patent describes a system for allowing a server to grant or deny access of information in a web document based upon a serial numbered program applet. Another example relating to electronic commerce is U.S. Pat. No. 5,790,677 issued to Fox et al. Telecommunication at the moment of an access request is inherently required for these patented methods to function.

A further example is U.S. Pat. No. 5,750,972 issued to Botvin. Botvin describes a document for conducting electronic financial transactions using either paper or electronic facsimile transmission of drafts drawn on a drawee bank. Again there is no means provided for a third or fourth party to verify authenticity without contacting the drawer/payee.

SUMMARY OF THE INVENTION

The above described and other limitations of the current systems being used to handle valuable document transactions are diminished or eliminated by the instant invention which allows a valuable document to be created in a decentralized fashion using ordinary plain paper. The document may even take electronic or other forms. Such valuable document created using the invention may only be created with the knowledge and specific authorization of the issuing authority. Further the document's authenticity may be verified without communication back to the issuing authority.

An advantage of the present invention is that it provides a system and method allowing the creation of valuable negotiable business documents at locations throughout the world. The creation may be done by any of an issuing authority, an agent of the issuing authority, a bearer and even the buyer.

A further advantage of the invention is that the issuing authority must have the critical or important details of the document and must authorize the creation of the document before it can be created.

A still further advantage of the invention is that anyone who is considering a purchase of a document created according to the instant invention has the ability to verify that the document is complete, authorized, negotiable and unaltered. Such verification can be accomplished by a prospective purchaser even when telecommunications of any type is not possible at the time of verification.

A special advantage exists with respect to retired or canceled negotiable electronic documents in that once an electronic document has been transmitted through various computers, it becomes impractical to be able to assure ones self that it can no longer be presented for value to an unsuspecting party. With the instant invention merely defacing or destroying the associated authenticator prevents negotiation of an electronic document.

These and other advantages are obtained by the instant invention through the means, method and system described hereinafter utilizing a universally known and accepted unique item that is independently identifiable so as to be constituted for difficulty of counterfeiting. The identity of the authenticator is included in an authorization calculation which can only be accomplished by an authorized issuing authority. In a preferred embodiment of the invention, the authenticator is a serial numbered item such as a currency bill or note.

DESCRIPTION OF A PREFERRED EMBODIMENT

Figure 1:
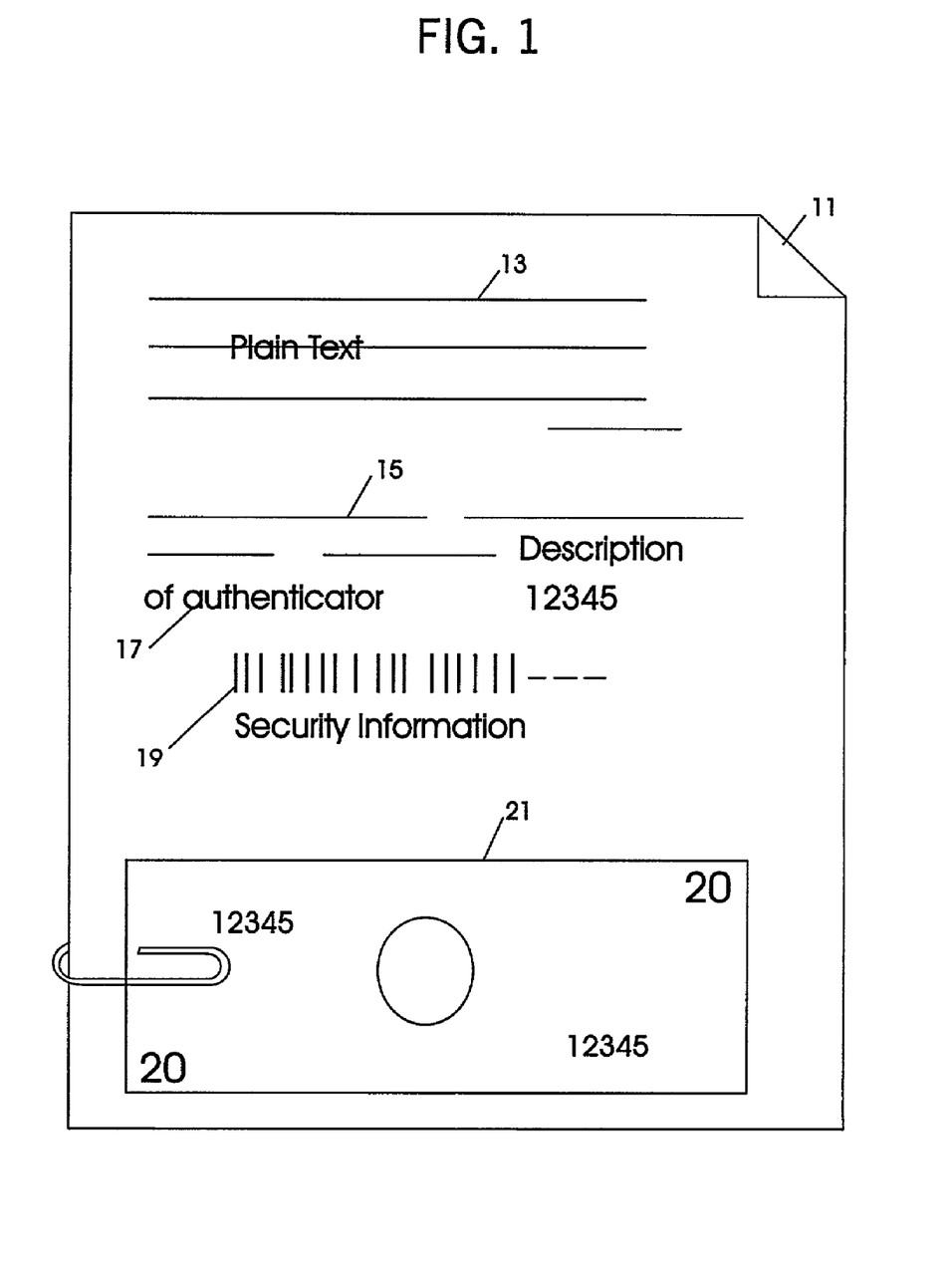
FIG. 1 is a diagram showing a valuable document according to the invention.

With reference to FIG. 1, a example valuable document 11 is shown as a printed paper document. Document 11 exemplifies any of a number of documents including order bills of lading, negotiable certificates of cargo insurance, lottery or other valuable tickets and other equivalent documents. It will also be understood that document 11 is not limited to a paper printed document but may be a document displayed on a computer screen or another intelligible form conveyed to a person who may be asked to accept the document 11 for value, such as in the transfer of a negotiable document.

Document 11 must of course have legible information 13 which is usually in the form of text but may also be graphical in nature. All or perhaps only some of the legible information 13 will be information 15 that is critical to a transaction. Other portions of information 13 may be non-critical transaction information, form information, instructions on how to complete filling out the document and so forth. The critical legible information 15 may include price, commodity or cargo identity, volume, weight, quality and other information that will allow a person accepting the document to make a judgment as to the value of the document being negotiated.

In order to accomplish the advantages of the invention, a description 17 of an authenticator token is needed and it is most convenient if such description is made part of the document for ease of verification by the person accepting the document. The authenticator is preferably a well known and accepted item such as a United States twenty dollar bill which can be tested for counterfeit status and therefore is unique. The description 17 of the authenticator preferably includes a serial number of the authenticator. A serial number is simple to include in an authentication calculation and is a form of uniqueness identification that is widely accepted.

Document 11 also preferably includes encrypted information 19 that is an encrypted derivation from information 15 and 17. The information 15 and 17 and the encrypted information 19 in the preferred embodiment of FIG. 1 is in the form of a bar code on a printed document 11. Any bar coded information can be scanned in to a computer workstation or personal digital assistant verification device that is being used to verify the authenticity of a document 11. Non-bar coded information can be entered into the verification device by other means such as keying, machine recognizable scanned image, or machine recognizable dictation.

Document 11 also is shown in FIG. 1 with a United States twenty dollar bill 21 attached with a paper clip near the bottom of the document. This bill 21 is the authenticator for document 11. When the authenticator 21 is present with the document 11, the document 11 can be verified to be the negotiable document. When the authenticator 21 is not present with the document 11, the document 11 may be verified to be an accurate copy of the negotiable instance of the document 11 but is not negotiable. There is only one negotiable instance of document 11 and to be the negotiable document, the document must have the unique authenticator present with the document. When a currency bill such as a twenty dollar bill is used as the authenticator, it must be surrendered with the document during a transaction. The value of the document 11 is then of course increased by the intrinsic value of the authenticator. Thus the value of document 11 in FIG. 1 is the stated value plus the $20 value of its authenticator.

Figure 2:
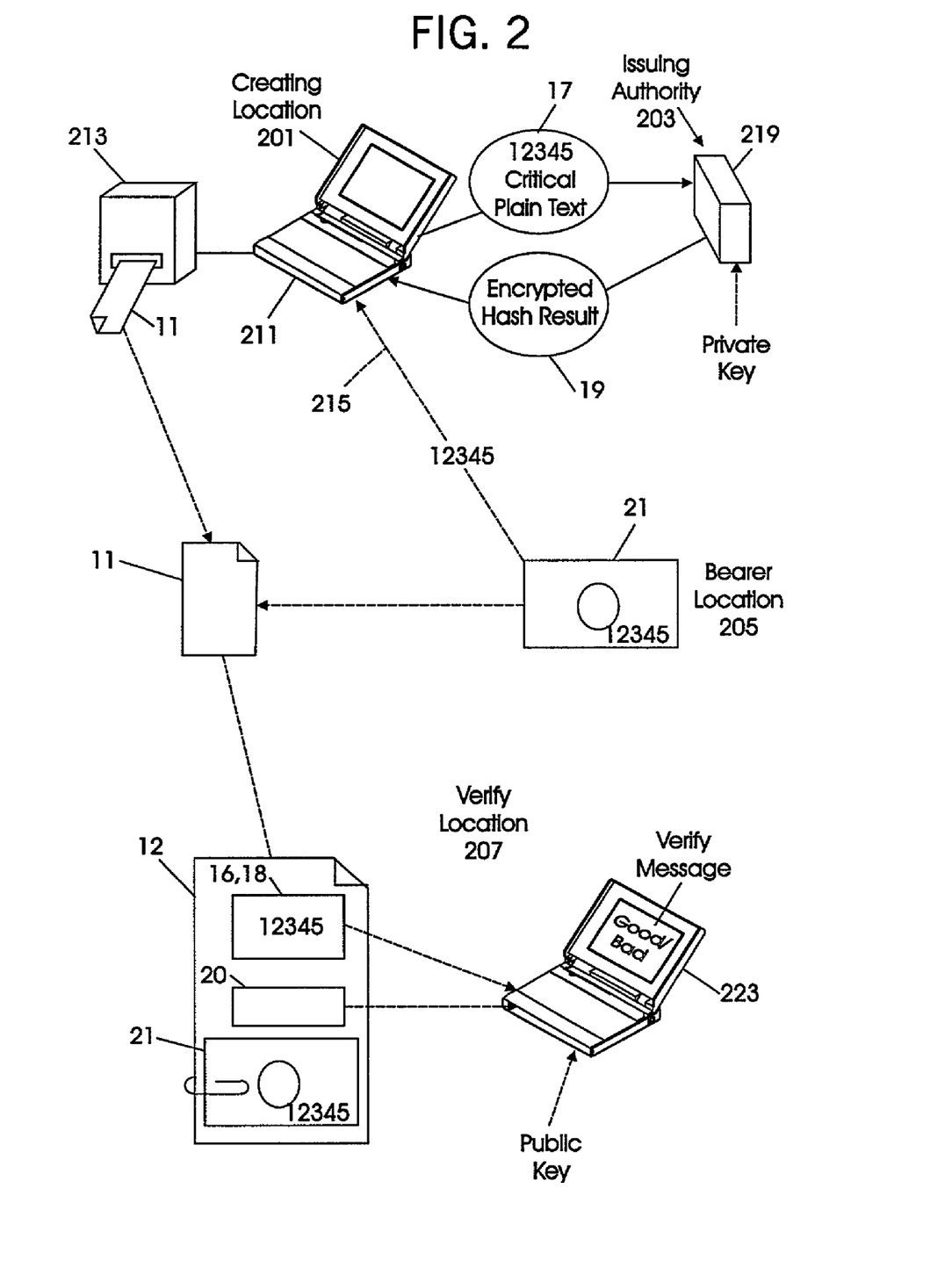
FIG. 2 is a system block diagram showing decentralized creation and verification of a valuable document according to the invention.

FIG. 2 shows a document creation station 211 having a display, a keyboard and a printer 213. Whoever is creating the document enters the critical plain text 15 for insertion into the document 11. Other plain text 13 may already be in a standard form in station 211 or it also may be entered by the creator from the keyboard. The description of the authenticator to be used is then obtained. The description may be already in the possession of the creator or it may be obtained via communication from a potential bearer who may be located anywhere. In the FIG. 2, a communication 215 is used to obtain a description "US twenty dollar bill 12345" from a future bearer at a location 205. The description will be provided by a person or machine via communication or by sending a facsimile image of the authenticator etc. In this FIG. 2, the serial number "12345" of the twenty dollar bill 21 is part of the description 17 of the authenticator 21.

After creating the critical text 15 and obtaining the authenticator description 17, these two items of information are sent to a computer 219 at an issuing authority location 203, where the issuing authority synthesizes encrypted information 19. The issuing authority may alter the critical text before synthesizing encrypted information 19. For example, the issuing authority may want to add its own account information, change or add details, etc.

At the issuing authority, the text 15 and the description 17 are hashed in the preferred embodiment, to obtain a hash result. The hash result is then encrypted with a private key of a public/private key pair to obtain encrypted information 19. It will be understood that hashing is a convenient but not a necessary step in practicing the instant invention. It will also be understood that other more complex and perhaps more secure encryption processes may be employed to obtain security information 19 if desired.

This encrypted result is then sent to the creating location 201 for inclusion into the document 11 as the security information 19. If the issuing authority altered the critical text 15, it too is sent back for inclusion in document 11. The document 11 is now complete and may be printed at printer 213 for hard copy mail delivery or delivered electronically to a bearer for use in a subsequent commercial transaction. Note that the bearer location 205 need not be a fixed location but it is only necessary that the authenticator, in this case a $20 bill, be conveyed so as to be present when the document 11 is presented for authentication verification and negotiation at a verify location 207 where a transaction may occur.

At the verify location 207, critical text 16 is taken from a document 12 and a description 18 of an authenticator 21 is taken from the document 12 that is presented for verification. The text 16 and the description 18 are hashed, at a personal digital assistant 223 for example, to obtain a trial hash result. Also the encrypted security information 20 is decrypted using the public key of the authorized public/private key pair to obtain the decrypted hash result that had been calculated at the issuing authority location 203. When the trial hash result and the decrypted hash result agree, the critical portions of the document 12 are verified to be an unaltered copy of the critical portions of the document 11 created by the creator at location 201. Of course, if the trial hash and the decrypted hash do not agree, either the document has been altered or it is in some other way not what it is purported to be.

The person receiving the document 12 then will compare the description of the authenticator 18 with the authenticator 21 presented with document 12. In this example, the authenticator 21 is a US twenty dollar bill which can be tested for counterfeit status using the same techniques applied by cashiers everywhere. When the bill 21 is determined to be genuine with the correct serial number, the receiving person will know that the combination of the unaltered document and the authenticator is the one and only negotiable instance of document 11 and can be honored. The method described above allows cancellation to prevent negotiation of an electronic document regardless of how many copies are extant in computers or other form merely by defacing or destroying the associated authenticator.

Figure 5:
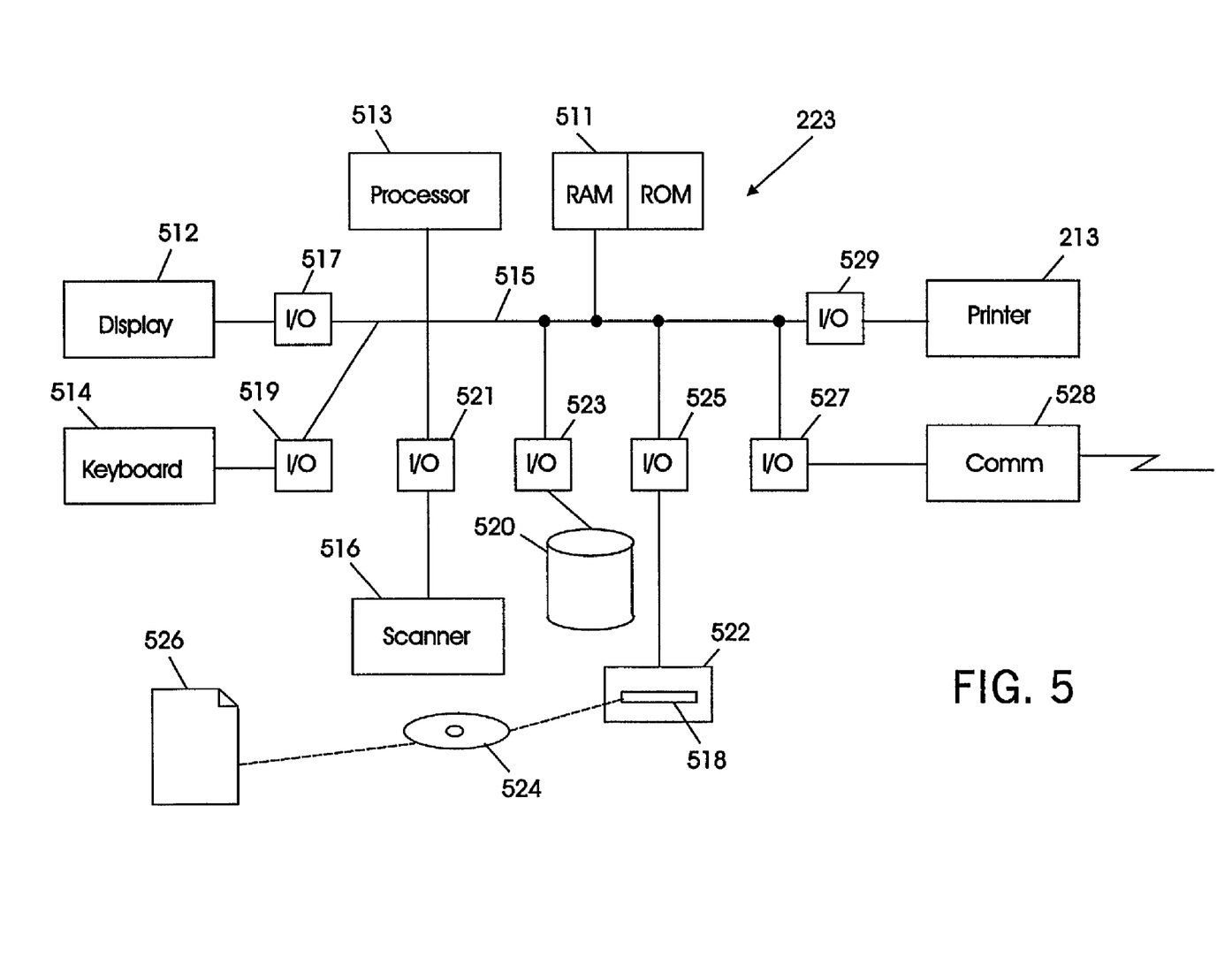
FIG. 5 is a block diagram of a workstation in accordance with a preferred embodiment of the invention.

Referring now to FIG. 5, a preferred embodiment of a workstation 211 and 223 is shown in block diagram form. The physical form of the workstation may be a personal computer, a personal digital assistant or other convenient embodiment. The workstation comprises, in addition to supporting elements such as power supply etc., random access memory 511, a central processing unit (CPU) 513, bus 515 and input output (I/O) adapters 517 through 529. Memory 511 may comprise any known type of data storage and/or transmission media, including magnetic media, optical media, random access memory (RAM), read-only memory (ROM), a data object, etc. Moreover, memory 511 may reside at a single physical location, comprising one or more types of data storage, or be distributed across a plurality of physical systems in various forms. CPU 513 may likewise comprise a single processing unit, or be distributed across one or more processing units in one or more locations, e.g., on a client and server, but are usually located in a single location. I/O 517 through 529 may comprise any known type of input output device circuitry and program control code. Adapter 517 connects display 512. Adapter 519 connects keyboard 514. Adapter 521 connects scanner 516. Adapter 523 connects a direct access storage device such as mass storage disk drive 520. Adapter 525 connects the media reader 522 having slot 518 which receives media 524 containing programmed logic 526. Adapter 527 connects a communication device such as a modem or local area network 528. Adapter 529 connects a printer 213 to workstation 211. Bus 515 provides a communication link between each of the components in the workstation and likewise may comprise any known type of transmission link, including electrical, optical, radio, etc. In addition, although not shown, additional components, such as cache memory, etc., may be incorporated into the workstation.

It is understood that the present invention can be realized in hardware, and/or a combination of hardware and software. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods. Computer program, software program, security or verification software, in the present context mean any expression, in any language, code or notation, of a set of instructions intended to cause a system having an information processing capability to perform a particular function either directly or after either or both of the following: (a) conversion to another language, code or notation; (b) reproduction in a different material form.

Figure 3:
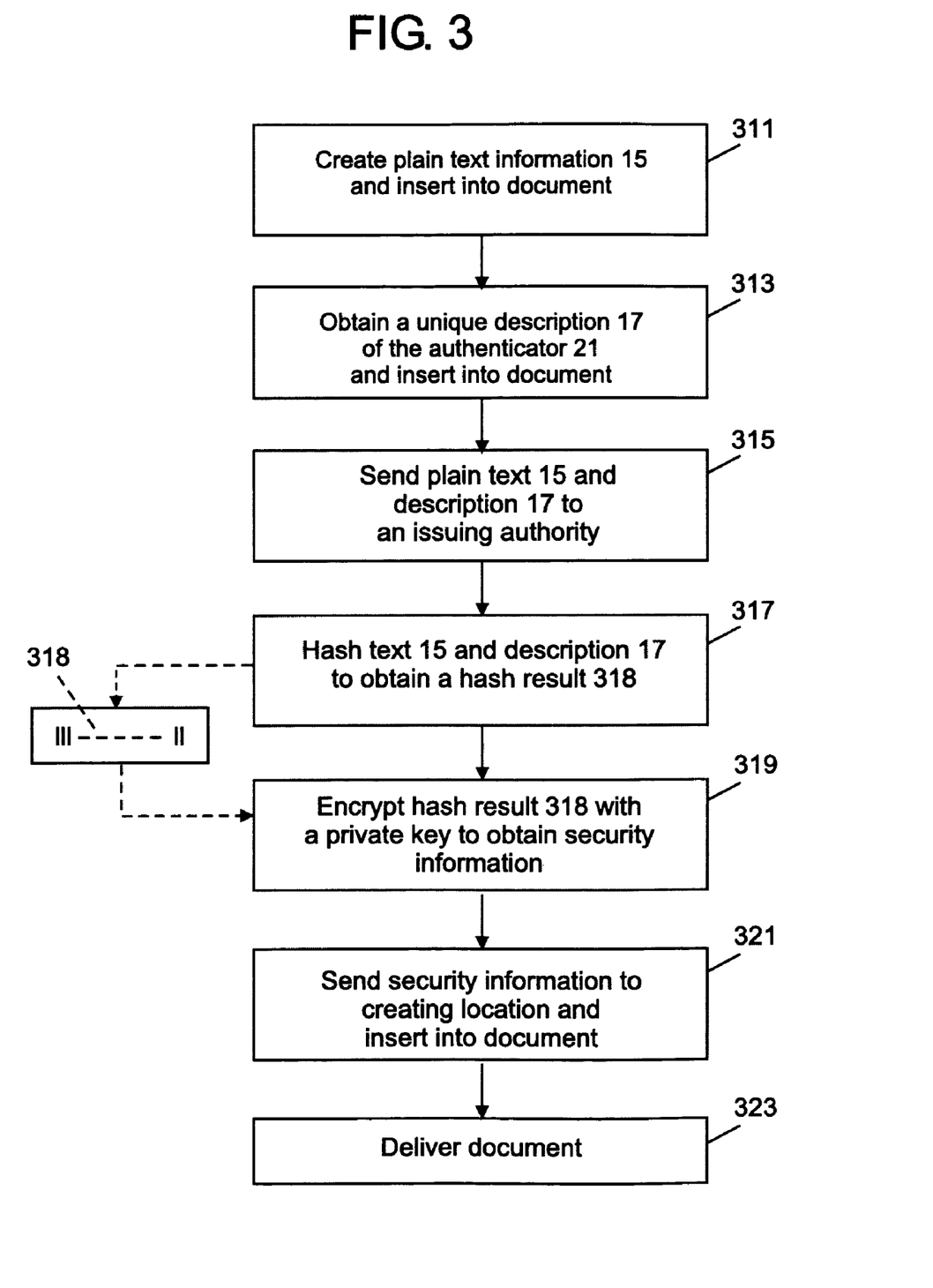
FIG. 3 is a flow diagram showing the steps of creating a valuable document according to the invention.

FIG. 3 is a flow diagram of a method for preparing a document according to the invention. The first step at block 311 is to obtain or create critical plain text 15 shown in FIG. 1 and insert the plain text 15 into the document 11. A next step at block 313 is to obtain or create a unique description 17 of the authenticator. In this preferred embodiment, the authenticator is a twenty dollar bill 21 having a serial number 12345. The description 17 is inserted into the document.

At block 315, the plain text 15 and the description 17 are sent to an issuing institution for use in security calculations. Block 317 represents the next step of calculating a hash value of the critical plain text 15 and the description of the authenticator 17. The calculation of a hash value is not crucial to the invention but is convenient when using currently known encryption techniques in that encryption of a hash value requires less time than would be required to encrypt the raw information 15 and 17 directly. Further, the encrypted hash is usually a shorter communication message than encryption of the raw data would be. For these and possibly other reasons, calculation and encryption of a hash is a preferred embodiment. The output of the hash step need not be shorter nor different from the input.

Block 319 shows the step of encrypting the hash value calculated in block 317 using the private key of a public/private key pair and an algorithm such as that described in ANSI standard X9.31. The result of the step performed at block 319 is encrypted information which is then sent at block 321 to the place where it will be available when needed to verify the authenticity and originality of the document. If the document is to be a printed paper document, the encrypted information 19 will be sent to the creating location for printing on document 11. If the document is electronic, the encrypted security information may be sent directly to a verifying location such as location 207 where it remains available for use when the document 12 is presented of negotiation.

At block 323 the document is delivered to the bearer as evidence of value. As stated herein above, the document may be an order bill of lading or a negotiable certificate of cargo insurance which has value to the shipper and can be exchanged for payment, by a financial institution, for the shipment which has been delivered to the carrier.

Figure 4:
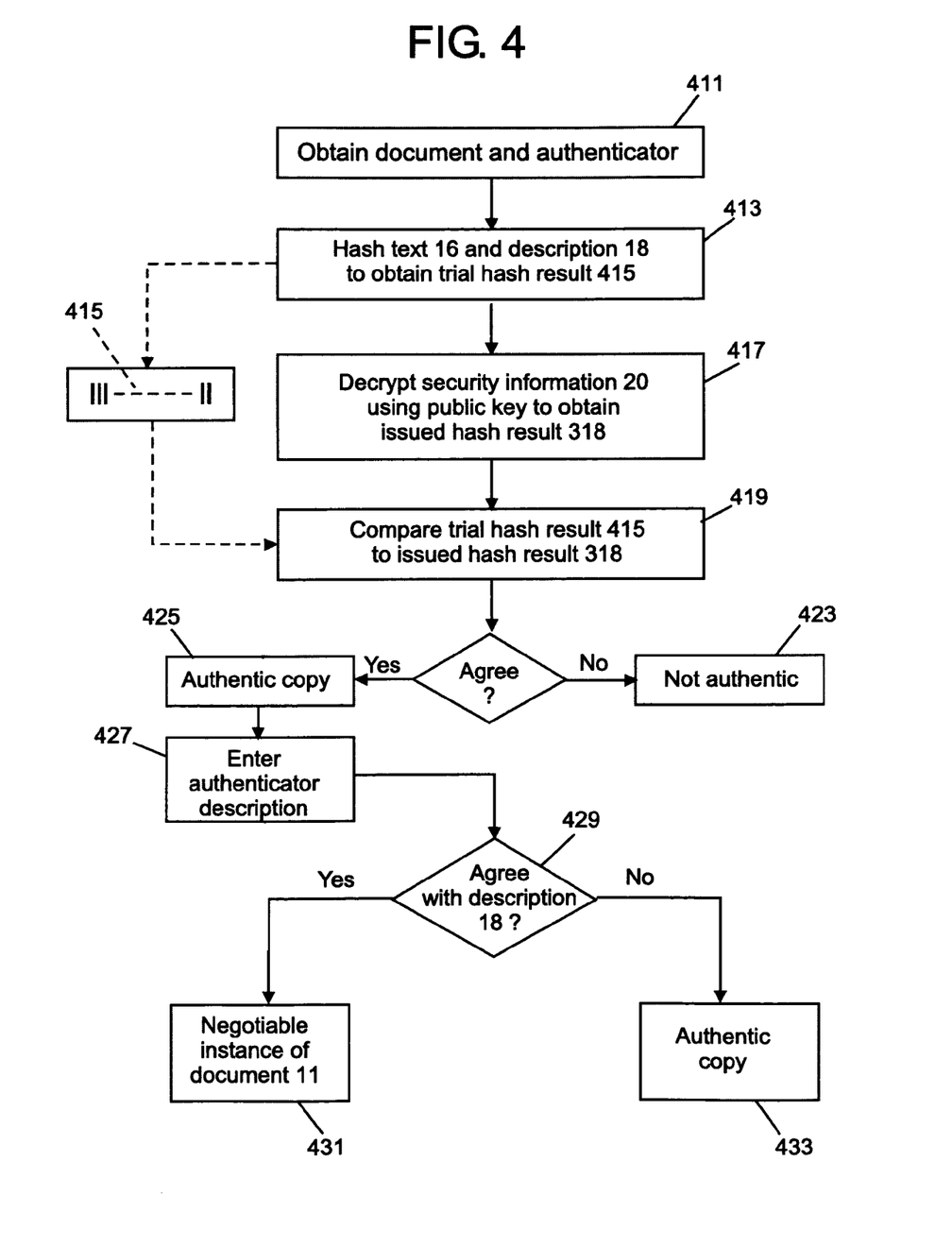
FIG. 4 is a flow diagram showing the steps of verifying the authenticity of a valuable document according to the invention.

Referring now to FIG. 4, the sequence of acts that will be performed at a verify location 207 regarding a document 12 being presented for negotiation is shown in flow diagram form. Presentment can be made in person, by mail, by facsimile or by electronic means. At block 411 the document and the authenticator are obtained by the party at verify location 207 who is being asked to accept the document 12 for value. If the document is electronic, the document will be received in a communication and stored in a computer or PDA 223. When document 12 is a paper document, the authenticator 21 can be an attachment to document 12 or at least presented at the same time. Alternately, the accepting party may have provided the authenticator description information 17 to the document creator at location 201 or directly to the issuing institution at location 203 and therefore the accepting party may already be in possession of authenticator 21.

The next act shown at block 413 is to calculate a hash of critical text 16 and authenticator description 18 to obtain a trial hash result 415. Block 417 shows the decryption of the encrypted security information 20 using the public key corresponding to the private key of the public/private key pair used by the issuing institution to generate the encrypted security information field 20. Decryption of unmodified encrypted security information 20 will yield the hash result 318 generated at step 317 of FIG. 3.

These hash results 415 and 318 are then compared at block 419. The comparison is then tested at block 421 and if they do not agree, the document 12 is not the an authentic copy of document 11 as represented in block 423 where "not authentic" is displayed at the verify location 207. If they do agree, as represented in block 425, document 12 is an authentic copy of document 11 and "authentic copy" is displayed.

To determine whether document 12 is the negotiable instance of document 11 to be accepted for value, the party at verify location 207 then enters into computer 223 at block 427, the description and serial number of authenticator 21 presented with document 12. The computer compares the description 18 from the document 12 with the description entered at block 427. If they agree at block 429, a message is displayed at block 431 indicating that document 12 is the only authentic negotiable instance of document 11 and can be accepted for value. If descriptions 18 and the description entered at block 427 do not agree, the authentic copy message may continue to be displayed indicating to the party at verify location 207 that the negotiable document 11 is still extant and document 12 should not be accepted for value. It will be understood that the description and serial number of authenticator 21 presented with document 12 can be manually compared with the description 18 from document 12 or a computer or other aid such as an optical tool can be employed to advantage.

Having described the system, apparatus and method of the invention, it will be understood by those skilled in the art of computer systems that many additional modifications and adaptations to the present invention can be made in both embodiment and application without departing from the spirit of this invention. For example, although the invention has been described with respect to certain applications, the invention is applicable to other uses in the verification of documents. Like wise, the preferred embodiment employs paper documents and electronically displayed documents but the invention is equally applicable to documents that need not be displayed, and accordingly, a document in a computer or an alternative mechanism may be used. Accordingly, this description should be considered as merely illustrative of the principles of the present invention which allows the verification of the authenticity of a unique instance of a document using a universally known and accepted unique item that is independently identifiable and is constituted for difficulty of counterfeiting and not in limitation thereof.

What is claimed is:

1. A method of verifying authenticity of a document comprising the steps of:

calculating trial security information by combining critical information from the document and a description of a serially numbered authenticator item which is not part of the document but is associated with the document, the document being capable of cancellation by defacing or destroying the unique authenticator item;

comparing the trial security information with a issuer security information read from the document;

determining that the document is an only negotiable copy of the document when the trial security information agrees with the issuer security information read from the document and the separate authenticator is present with the document; and determining that the document is an authentic not negotiable copy of the negotiable document when the calculated security information agrees with the security information read from the security information field and the separate authenticator is not present with the document; and determining that the document is not an authentic copy of the negotiable document when the calculated security information does not agree with the security information read from the security information field and is not negotiable;

canceling the document in all of its copies by defacing or destroying the unique authenticator item.

2. The method of claim 1 further comprising the steps of: obtaining the critical information from the document and obtaining the description of an separate authenticator item associated with the document from the document.

3. The method of claim 1 further comprising the steps of: obtaining the critical information from the document and obtaining the description of an separate authenticator item associated with the document from information about the document, entered by a party being asked to accept the document.

* * * * *